(12) United States Patent
Fischer et al.

(10) Patent No.: US 7,117,231 B2
(45) Date of Patent: Oct. 3, 2006

(54) METHOD AND SYSTEM FOR THE AUTOMATIC GENERATION OF MULTI-LINGUAL SYNCHRONIZED SUB-TITLES FOR AUDIOVISUAL DATA

(75) Inventors: Uwe Fischer, Boeblingen (DE); Stefan Hoffmann, Weil im Schoenbuch (DE); Werner Kriechbaum, Ammerbuch-Breitenholz (DE); Gerhard Stenzel, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 09/994,544

(22) Filed: Nov. 27, 2001

(65) Prior Publication Data

US 2002/0087569 A1 Jul. 4, 2002

(30) Foreign Application Priority Data

Dec. 7, 2000 (EP) .................................. 00126893

(51) Int. Cl.
*G06F 17/30* (2006.01)
(52) U.S. Cl. ........................ 707/203; 707/10; 707/101; 707/102; 707/103 Y; 707/104.1; 704/218
(58) Field of Classification Search ................ 348/589; 704/255, 278, 218; 707/10, 101, 102, 103 Y, 707/104.1, 203; 386/97
See application file for complete search history.

(56) References Cited

U.S. PATENT DOCUMENTS

| 5,497,241 | A | * | 3/1996 | Ostrover et al. ............... 386/97 |
| 5,515,490 | A | * | 5/1996 | Buchanan et al. ......... 715/500.1 |
| 5,576,843 | A | * | 11/1996 | Cookson et al. ............... 386/97 |
| 5,649,060 | A | * | 7/1997 | Ellozy et al. ................ 704/278 |
| 5,731,847 | A | * | 3/1998 | Tsukagoshi .................. 348/589 |
| 5,794,197 | A | * | 8/1998 | Alleva et al. ................ 704/255 |
| 6,085,192 | A | * | 7/2000 | Mendez et al. ................ 707/10 |
| 6,405,219 | B1 | * | 6/2002 | Saether et al. .............. 707/201 |
| 6,718,351 | B1 | * | 4/2004 | Sellen et al. ................ 707/203 |
| 2001/0042073 | A1 | * | 11/2001 | Saether et al. .............. 707/203 |

OTHER PUBLICATIONS

Kim, Woosaeng: Deepak Kenchamman-Hosekote; Ee Peng Lim; Jaideep Srivastava; "Synchronization Relation Tree: A Model for Temporal Synchronization in Multimedia Presentations", 1992, University of Minnesota, (30 pages).*
Rutledge, Lloyd; Jacco van Ossenbruggen; Lynda Hardman; and Dick C.A. Bulterman; "Cooperative Use of MHEG-5 and HyTime", 1997, Proceedings of Hypertexts and Hypermedia: Products Tools and Methods (16 pages).*
Garbinato, Benoit; Guerraoui, Rachid, "Using the Strategy Design Pattern to Compose Reliable Distributed Protocols", 1997, Proceedings of the Third USENIX Conference on Object-Oriented Technologies and Systems (13 pages).*
Magrin-Chagnolleau, Ivan; Aaron E. Rosenberg; and S. Parthasarathy; "Detection of Target Speakers in Audio Databases," Mar. 16-19, 1999, ICASSP '99 (4 pages).*

* cited by examiner

*Primary Examiner*—Thuy N. Pardo
(74) *Attorney, Agent, or Firm*—Akerman Senterfitt

(57) ABSTRACT

The present invention provides a method and system for computerized synchronization of an audio stream having a first synchronized textual representation usable for subtitling of the audio stream in the original language, with a second synchronized textual representation which can be used as an alternative subtitle including a transcription of the original language into another language. Time synchronous links can be built between the audio stream and, for instance, the textual representations of the words spoken in the audio stream. More particularly, the second representation can inherit the synchronization between the audio stream and the first representation using structure association information determined between the first and the second representation.

16 Claims, 18 Drawing Sheets

| Tree-locator | Segment Type | Offset Start | Stop |
|---|---|---|---|
| 1 | M | 0:00 | 10:00 |
| 1 1 | N | 0:00 | 0:20 |
| 1 2 | S | 0:20 | 9:40 |
| 1 3 | N | 9:40 | 10:00 |
| 1 2 1 | 1 | 0:20 | 0:45 |
| 1 2 2 | 2 | 0:45 | 2:30 |
| 1 2 3 | 1 | 2:30 | 3:25 |
| 1 2 4 | 2 | 3:25 | 10:00 |
| 1 2 1 1 | P | 0:20 | 0:45 |
| 1 2 2 1 | P | 0:45 | 1:10 |
| 1 2 2 2 | P | 1:10 | 1:55 |
| . . . . . | | | |

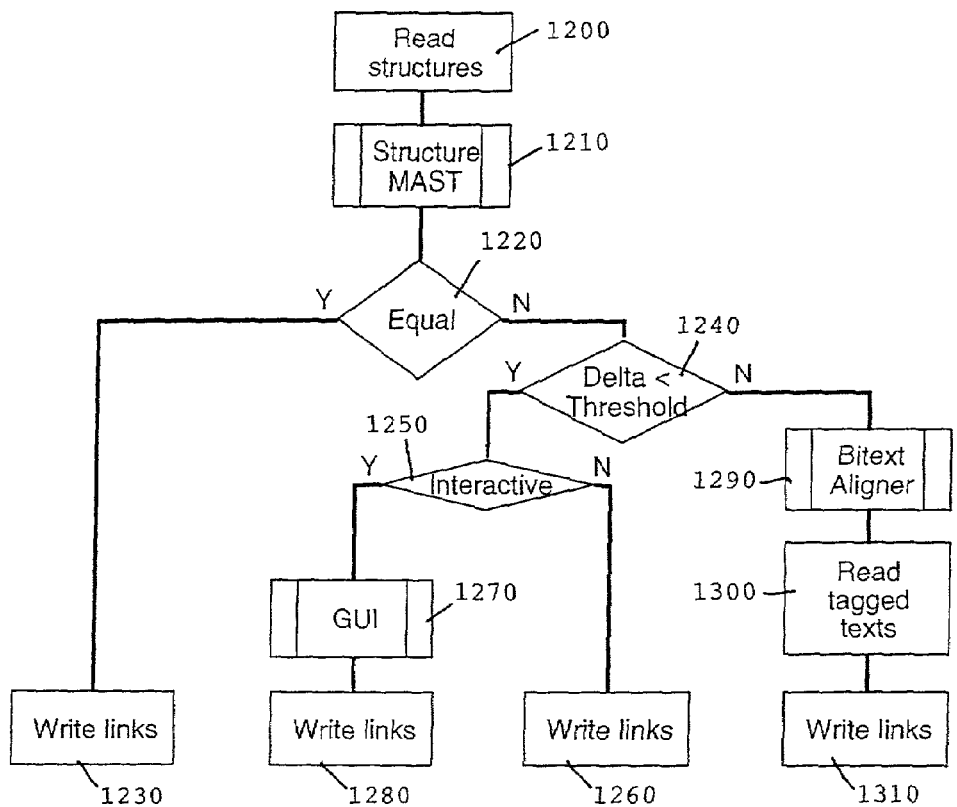

FIG. 11

The first one, short and fair-
haired, smiled back and started up the last flight of steps.
His companion, taller and darker, took a deep breath, then came up behind him.
When the first man got to the door, he paused and waited for the other to join him.

'Dottoressa Lynch?' the blond one asked, pronouncing her last name in the
Italian fashion.

'Yes,' she answered, stepping back from the door to allow them to enter.

Der erste, klein und blond, laechelte zurueck und betrat das letzte Treppenstueck.
Sein Begleiter, groeszer und dunkler, holte noch einmal tief Luft und kam ihm nach.
Als der erste Mann bei der Tuer angelangt war, blieb er stehen und wartete
auf den anderen.

"Dottoressa Lynch?" fragte der Blonde

"Ja", antwortete sie, indem sie zuruecktrat, um sie hereinzulassen.

FIG. 12

```
<!DOCTYPE book SYSTEM "book.dtd" [
]>
<book>
<chapter>
<section>
<p>
<s>The first one, short and fair-
haired, smiled back and started up the last flight of steps.</s>
<s>His companion, taller and darker, took a deep breath, then came up behind him.</s>
<s>When the first man got to the door, he paused and waited for the other to join him.</s>
</p>
<p>
<s>'Dottoressa Lynch?' the blond one asked, pronouncing her last name in the Ital-
ian fashion.</s>
<s>'Yes,' she answered, stepping back from the door to allow them to enter.</s>
</p>
</section>
</chapter>
</book>

<!DOCTYPE book SYSTEM "book.dtd" [
]>
<book>
<chapter>
<section>
<p>
<s>Der erste, klein und blond, laechelte zurueck und betrat das let-
zte Treppenstueck.</s>
<s>Sein Begleiter, groeszer und dunkler, holte noch ein-
mal tief Luft und kam ihm nach.</s>
<s>Als der erste Mann bei der Tuer angelangt war, blieb er ste-
hen und wartete auf den anderen.</s>
</p>
<p>
<s>"Dottoressa Lynch?" fragte der Blonde</s>
</p>
<p>
<s>"Ja", antwortete sie, indem sie zuruecktrat, um sie hereinzulassen.</s>
</p>
</section>
</chapter>
</book>
```

FIG. 13

| Tree Locator | SGML Id |
|---|---|
| 1 1 1 1 1 1 | ldeutsch1 |
| 1 1 1 1 2 1 | ldeutsch2 |
| 1 1 1 1 3 1 | ldeutsch3 |
| 1 1 1 2 1 1 | ldeutsch4 |
| 1 1 1 3 1 1 | ldeutsch5 |

| Tree Locator | SGML Id |
|---|---|
| 1 1 1 1 1 1 | leng1 |
| 1 1 1 1 2 1 | leng2 |
| 1 1 1 1 3 1 | leng3 |
| 1 1 1 2 1 1 | leng4 |
| 1 1 1 3 1 1 | leng5 |

| Tree locator | Text |
|---|---|
| 1 1 1 1 1 1 | The first one, short and fair-haired, smiled back and started up the last flight of steps. |
| 1 1 1 1 2 1 | His companion, taller and darker, took a deep breath, then came up behind him. |
| 1 1 1 1 3 1 | When the first man got to the door, he paused and waited for the other to join him. |
| 1 1 1 2 1 1 | 'Dottoressa Lynch?' the blond one asked, pronouncing her last name in the Italian fashion. |
| 1 1 1 3 1 1 | 'Yes,' she answered, stepping back from the door to allow them to enter. |

| Tree locator | Text |
|---|---|
| 1 1 1 1 1 1 | Der erste, klein und blond, laechelte zurueck und betrat das letzte Treppenstueck. |
| 1 1 1 1 2 1 | Sein Begleiter, groeszer und dunkler, holte noch einmal tief Luft und kam ihm nach. |
| 1 1 1 1 3 1 | Als der erste Mann bei der Tuer angelangt war, blieb er stehen und wartete auf den anderen. |
| 1 1 1 2 1 1 | "Dottoressa Lynch?" fragte der Blonde |
| 1 1 1 3 1 1 | "Ja", antwortete sie, indem sie zuruecktrat, um sie hereinzulassen. |

FIG. 15

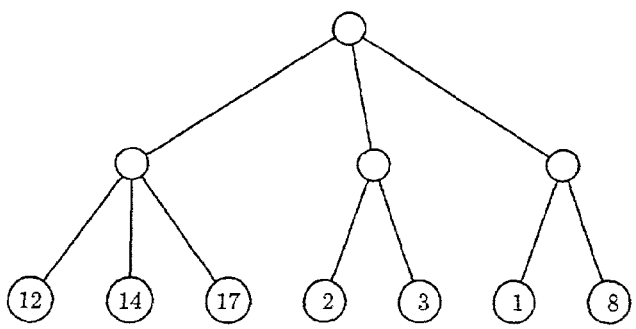

FIG. 17

```
<!DOCTYPE linkweb SYSTEM "linkweb.dtd" [
  <!ENTITY elink SYSTEM "leone.sgm" CDATA SGML>
  <!ENTITY dlink SYSTEM "leond.sgm" CDATA SGML>
]>

<linkweb>

<audio linkends="leng1 ldeutsch1">
<treeloc id="leng1"> locsrc=elink>1</treeloc>
<treeloc id="ldeutsch1" locsrc=dlink>1</treeloc>

<audio linkends="leng2 ldeutsch2">
<treeloc id="leng2"> locsrc=elink>1 1</treeloc>
<treeloc id="ldeutsch2" locsrc=dlink>1 1</treeloc>

<audio linkends="leng3 ldeutsch3">
<treeloc id="leng3"> locsrc=elink>1 1 1</treeloc>
<treeloc id="ldeutsch3" locsrc=dlink>1 1 1</treeloc>

<audio linkends="leng4 ldeutsch4">
<treeloc id="leng4"> locsrc=elink>1 1 2</treeloc>
<treeloc id="ldeutsch4" locsrc=dlink>1 1 2</treeloc>

<audio linkends="leng5 ldeutsch5">
<treeloc id="leng5"> locsrc=elink>1 1 3</treeloc>
<treeloc id="ldeutsch5" locsrc=dlink>1 1 3</treeloc>

<audio linkends="leng6 ldeutsch6">
<treeloc id="leng6"> locsrc=elink>1 2</treeloc>
<treeloc id="ldeutsch6" locsrc=dlink>1 2</treeloc>

<audio linkends="leng7 ldeutsch7">
<treeloc id="leng7"> locsrc=elink>1 2 1</treeloc>
<treeloc id="ldeutsch7" locsrc=dlink>1 2 1</treeloc>

<audio linkends="leng8 ldeutsch8">
<treeloc id="leng8"> locsrc=elink>1 2 2</treeloc>
<treeloc id="ldeutsch8" locsrc=dlink>1 2 2</treeloc>

```
<!DOCTYPE linkweb SYSTEM "linkweb.dtd" [
  <!ENTITY elink SYSTEM "leone.sgm" CDATA SGML>
  <!ENTITY dlink SYSTEM "leond.sgm" CDATA SGML>
]>

<linkweb>

<audio linkends="leng1 ldeutsch1 audio1">
<treeloc id="leng1"> locsrc=elink>1</treeloc>
<treeloc id="ldeutsch1" locsrc=dlink>1</treeloc>
<urlloc id="audio1">file=aquca.wav start=xxx end=yyy unit=ms</urlloc>

<audio linkends="leng2 ldeutsch2 audio2">
<treeloc id="leng2"> locsrc=elink>1 1</treeloc>
<treeloc id="ldeutsch2" locsrc=dlink>1 1</treeloc>
<urlloc id="audio2">file=aquca.wav start=xxx end=yyy unit=ms</urlloc>

<audio linkends="leng3 ldeutsch3 audio3">
<treeloc id="leng3"> locsrc=elink>1 1 1</treeloc>
<treeloc id="ldeutsch3" locsrc=dlink>1 1 1</treeloc>
<urlloc id="audio3">file=aquca.wav start=xxx end=yyy unit=ms</urlloc>

<audio linkends="leng4 ldeutsch4 audio4">
<treeloc id="leng4"> locsrc=elink>1 1 2</treeloc>
<treeloc id="ldeutsch4" locsrc=dlink>1 1 2</treeloc>
<urlloc id="audio4">file=aquca.wav start=xxx end=yyy unit=ms</urlloc>

<audio linkends="leng5 ldeutsch5 audio5">
<treeloc id="leng5"> locsrc=elink>1 1 3</treeloc>
<treeloc id="ldeutsch5" locsrc=dlink>1 1 3</treeloc>
<urlloc id="audio5">file=aquca.wav start=xxx end=yyy unit=ms</urlloc>

<audio linkends="leng6 ldeutsch6 audio6">
<treeloc id="leng6"> locsrc=elink>1 2</treeloc>
<treeloc id="ldeutsch6" locsrc=dlink>1 2</treeloc>
<urlloc id="audio6">file=aquca.wav start=xxx end=yyy unit=ms</urlloc>

<audio linkends="leng7 ldeutsch7 audio7">
<treeloc id="leng7"> locsrc=elink>1 2 1</treeloc>
<treeloc id="ldeutsch7" locsrc=dlink>1 2 1</treeloc>
<urlloc id="audio7">file=aquca.wav start=xxx end=yyy unit=ms</urlloc>

<audio linkends="leng8 ldeutsch8 audio8">
<treeloc id="leng8"> locsrc=elink>1 2 2</treeloc>
<treeloc id="ldeutsch8" locsrc=dlink>1 2 2</treeloc>
<urlloc id="audio8">file=aquca.wav start=xxx end=yyy unit=ms</urlloc>

```
<![ CDATA [
<!DOCTYPE linkweb SYSTEM "linkweb.dtd" [
  <!ENTITY elink SYSTEM "leone.sgm" CDATA SGML>
]>

<linkweb>

<primaryLink linkends="leng1 audio1">
<treeloc id="leng1"> locsrc=elink>1</treeloc>
<urlloc id="audio1">file=aquca.wav start=200 end=3579300 unit=ms</urlloc>

<primaryLink linkends="leng2 audio2">
<treeloc id="leng2"> locsrc=elink>1 1</treeloc>
<urlloc id="audio2">file=aquca.wav start=200 end=17100 unit=ms</urlloc>

<primaryLink linkends="leng3 audio3">
<treeloc id="leng3"> locsrc=elink>1 1 1</treeloc>
<urlloc id="audio3">file=aquca.wav start=200 end=7100 unit=ms</urlloc>

<primaryLink linkends="leng4 audio4">
<treeloc id="leng4"> locsrc=elink>1 1 2</treeloc>
<urlloc id="audio4">file=aquca.wav start=7100 end=12400 unit=ms</urlloc>

<primaryLink linkends="leng5 audio5">
<treeloc id="leng5"> locsrc=elink>1 1 3</treeloc>
<urlloc id="audio5">file=aquca.wav start=12400 end=17100 unit=ms</urlloc>

<primaryLink linkends="leng6 audio6">
<treeloc id="leng6"> locsrc=elink>1 2</treeloc>
<urlloc id="audio6">file=aquca.wav start=17100 end=27900 unit=ms</urlloc>

<primaryLink linkends="leng7 audio7">
<treeloc id="leng7"> locsrc=elink>1 2 1</treeloc>
<urlloc id="audio7">file=aquca.wav start=17100 end=23500 unit=ms</urlloc>

<primaryLink linkends="leng8 audio8">
<treeloc id="leng8"> locsrc=elink>1 2 2</treeloc>
<urlloc id="audio8">file=aquca.wav start=23500 end=27900 unit=ms</urlloc>

```
<![ CDATA [
<!DOCTYPE linkweb SYSTEM "linkweb.dtd" [
  <!ENTITY elink SYSTEM "leone.sgm" CDATA SGML>
  <!ENTITY dlink SYSTEM "leond.sgm" CDATA SGML>
]>

<linkweb>

<repRepLink linkends="leng1 ldeutsch1">
<treeloc id="leng1"> locsrc=elink>1</treeloc>
<treeloc id="ldeutsch1" locsrc=dlink>1</treeloc>

<repRepLink linkends="leng2 ldeutsch2">
<treeloc id="leng2"> locsrc=elink>1 1</treeloc>
<treeloc id="ldeutsch2" locsrc=dlink>1 1</treeloc>

<repRepLink linkends="leng3 ldeutsch3">
<treeloc id="leng3"> locsrc=elink>1 1 1</treeloc>
<treeloc id="ldeutsch3" locsrc=dlink>1 1 1</treeloc>

<repRepLink linkends="leng4 ldeutsch4">
<treeloc id="leng4"> locsrc=elink>1 1 2</treeloc>
<treeloc id="ldeutsch4" locsrc=dlink>1 1 2</treeloc>

<repRepLink linkends="leng5 ldeutsch5">
<treeloc id="leng5"> locsrc=elink>1 1 3</treeloc>
<treeloc id="ldeutsch5" locsrc=dlink>1 1 3</treeloc>

<repRepLink linkends="leng6 ldeutsch6">
<treeloc id="leng6"> locsrc=elink>1 2</treeloc>
<treeloc id="ldeutsch6" locsrc=dlink>1 2</treeloc>

<repRepLink linkends="leng7 ldeutsch7">
<treeloc id="leng7"> locsrc=elink>1 2 1</treeloc>
<treeloc id="ldeutsch7" locsrc=dlink>1 2 1</treeloc>

<repRepLink linkends="leng8 ldeutsch8">
<treeloc id="leng8"> locsrc=elink>1 2 2</treeloc>
<treeloc id="ldeutsch8" locsrc=dlink>1 2 2</treeloc>

```
<![ CDATA [
<!DOCTYPE linkweb SYSTEM "linkweb.dtd" [
  <!ENTITY elink SYSTEM "leone.sgm" CDATA SGML>
  <!ENTITY dlink SYSTEM "leond.sgm" CDATA SGML>
]>

<linkweb>

<mLink linkends="leng1 ldeutsch1 audio1">
<treeloc id="leng1"> locsrc=elink>1</treeloc>
<treeloc id="ldeutsch1" locsrc=dlink>1</treeloc>
<urlloc id="audio1">file=aquca.wav start=200 end=3579300 unit=ms</urlloc>

<mLink linkends="leng2 ldeutsch2 audio2">
<treeloc id="leng2"> locsrc=elink>1 1</treeloc>
<treeloc id="ldeutsch2" locsrc=dlink>1 1</treeloc>
<urlloc id="audio2">file=aquca.wav start=200 end=17100 unit=ms</urlloc>

<mLink linkends="leng3 ldeutsch3 audio3">
<treeloc id="leng3"> locsrc=elink>1 1 1</treeloc>
<treeloc id="ldeutsch3" locsrc=dlink>1 1 1</treeloc>
<urlloc id="audio3">file=aquca.wav start=200 end=7100 unit=ms</urlloc>

<mLink linkends="leng4 ldeutsch4 audio4">
<treeloc id="leng4"> locsrc=elink>1 1 2</treeloc>
<treeloc id="ldeutsch4" locsrc=dlink>1 1 2</treeloc>
<urlloc id="audio4">file=aquca.wav start=7100 end=12400 unit=ms</urlloc>

<mLink linkends="leng5 ldeutsch5 audio5">
<treeloc id="leng5"> locsrc=elink>1 1 3</treeloc>
<treeloc id="ldeutsch5" locsrc=dlink>1 1 3</treeloc>
<urlloc id="audio5">file=aquca.wav start=12400 end=17100 unit=ms</urlloc>

<mLink linkends="leng6 ldeutsch6 audio6">
<treeloc id="leng6"> locsrc=elink>1 2</treeloc>
<treeloc id="ldeutsch6" locsrc=dlink>1 2</treeloc>
<urlloc id="audio6">file=aquca.wav start=17100 end=27900 unit=ms</urlloc>

<mLink linkends="leng7 ldeutsch7 audio7">
<treeloc id="leng7"> locsrc=elink>1 2 1</treeloc>
<treeloc id="ldeutsch7" locsrc=dlink>1 2 1</treeloc>
<urlloc id="audio7">file=aquca.wav start=17100 end=23500 unit=ms</urlloc>

<mLink linkends="leng8 ldeutsch8 audio8">
<treeloc id="leng8"> locsrc=elink>1 2 2</treeloc>
<treeloc id="ldeutsch8" locsrc=dlink>1 2 2</treeloc>
<urlloc id="audio8">file=aquca.wav start=23500 end=27900 unit=ms</urlloc>

METHOD AND SYSTEM FOR THE AUTOMATIC GENERATION OF MULTI-LINGUAL SYNCHRONIZED SUB-TITLES FOR AUDIOVISUAL DATA

CROSS-REFERENCE TO RELATED APPLICATIONS

This application claims the benefit of European Application No. 00126893.7, filed Dec. 7, 2000 at the European Patent Office.

BACKGROUND OF THE INVENTION

1. Technical Field

The present invention relates to the field of multimedia data handling, and more specifically, to a computer-based method and system for performing synchronized sub-titling of audio or audio-visual material in a multitude of different languages.

2. Description of the Related Art

Presently, most moving picture productions, such as movies, commercials, or the like, aim at an international audience. Thus, these productions can be distributed in languages other than the original language used during production. Moreover additional synchronized language versions can be assembled in which all dialogues and narrative sequences are spoken in the mother tongue of a particular audience.

Since the time efforts and costs for producing such synchronized versions are substantial, these language adaptations are usually produced only for the world's major languages. But for the languages spoken in smaller market segments, either the original production or a sub-titled version is used. In a sub-titled version, the translation of the spoken components appears as a synchronized textual overlay, usually in the lower area of the image. Accordingly, the term 'sub-title' is understood to refer generally to a textual, time-tagged representation that has to be rendered to become visible or audible.

Modern distribution media such as DVD can include an assembled international version of any audio-visual material which can contain both multiple sound-tracks for different languages, as well as multiple sub-title streams that can be selected and switched by the user during playback. Currently, most of this information has to be generated and synchronized manually.

SUMMARY OF THE INVENTION

It is therefore an object of the present invention to provide a computer-assisted or computer-based method and system for synchronizing a realization of a media stream having a synchronized first representation with at least one second representation. Another object is to synchronize the realization with the at least one second representation automatically. Yet another object is to generate further synchronized sub-titles for media streams with an existing first sub-title. The objects can be solved by the features of the independent claims. Further advantageous embodiments of the present invention are described within the dependent claims.

The present invention accomplishes the foregoing by building time-synchronous links between the realization of the media stream, i.e. the audio or video material itself, and the representations, for instance the textual representations of the words spoken in the audio-visual material. The invention can provide a synchronization between the realization and a first representation. The synchronization information can be provided to, or inherited by, the at least one second representation of the realization. This can be accomplished using structure association information determined between the first and the at least one second representation. Notably, the term inheritance is understood in the broadest sense, and is by no means limited to the same term used in modern programming languages.

Thus, the invention allows for an automatic computer-based or computer-assisted generation of sub-titled or synchronized versions of audio-visual material in languages other than the one used during production. It is noteworthy that the sub-titles generated in accordance with the inventive arrangements disclosed herein can be rendered not only by overlaying the video with a written representation of the spoken data, but can be fed into a system generating a rendering in sign language for the hearing impaired. This can be especially useful in countries where such a version is a legal requirement for public broadcast. Moreover, the subtitles generated in accordance with the inventive arrangements disclosed herein can be fed into a speech-synthesis system to become audible.

It should be appreciated that the automatic generation and synchronization of language adapted versions is by no means restricted to the aforementioned movie industry. For instance, in language-learning applications, the aforementioned techniques can be used to synchronize an inter-linear translation with the audio material in order to better facilitate a student's understanding of the material.

In the field of Digital Audio Broadcasting (DAB), the proposed method and system can facilitate the transmission of the original version of an interview, for example, together with a translation of it as running text visible in the display of a DAB receiver. Additionally, an ever increasing group of companies use TV broadcasting as internal business TV. Companies using internal business TV on an international scale have to cope with the need of providing translations or sub-titles in a plenitude of languages.

BRIEF DESCRIPTION OF THE DRAWINGS

The invention will be understood more readily from the following detailed description when taken in conjunction with the accompanying drawings.

FIG. 11 is a flow diagram illustrating a text structure aligner in accordance with the inventive arrangements disclosed herein.

FIG. 12 is a text sample and corresponding translation.

FIG. 13 is a structured text sample and corresponding translation.

FIG. 15 is an exemplary mapping table between a Tree Locator and Text.

FIG. 17 is a schematic diagram illustrating an exemplary document structure of the translation of the text sample as determined by the text structurer of the first embodiment where sentence nodes are labeled by the number of dependent word nodes.

FIG. 18 illustrates an exemplary alignment of the document structures for text and translation for the above text sample expressed as HyTime links.

FIG. 20 illustrates exemplary links for the alignment of text, translation, and audio of the sample text of FIG. 12 expressed in SGML syntax.

FIG. 22 illustrates an exemplary synchronization expressed by HyTime links in accordance with standard ISO 10744.

FIG. 23 illustrates an exemplary output of the step of analyzing the structure of two representations A and B and synchronizing the two revealed structures with each other in order to build structure links between equivalent structural elements of both representations.

FIG. 24 illustrates exemplary series of links based upon which a synchronization can be used to provide a time-synchronous alignment between a representation B and a video/audio stream.

DETAILED DESCRIPTION OF THE DRAWINGS

Figure 1:
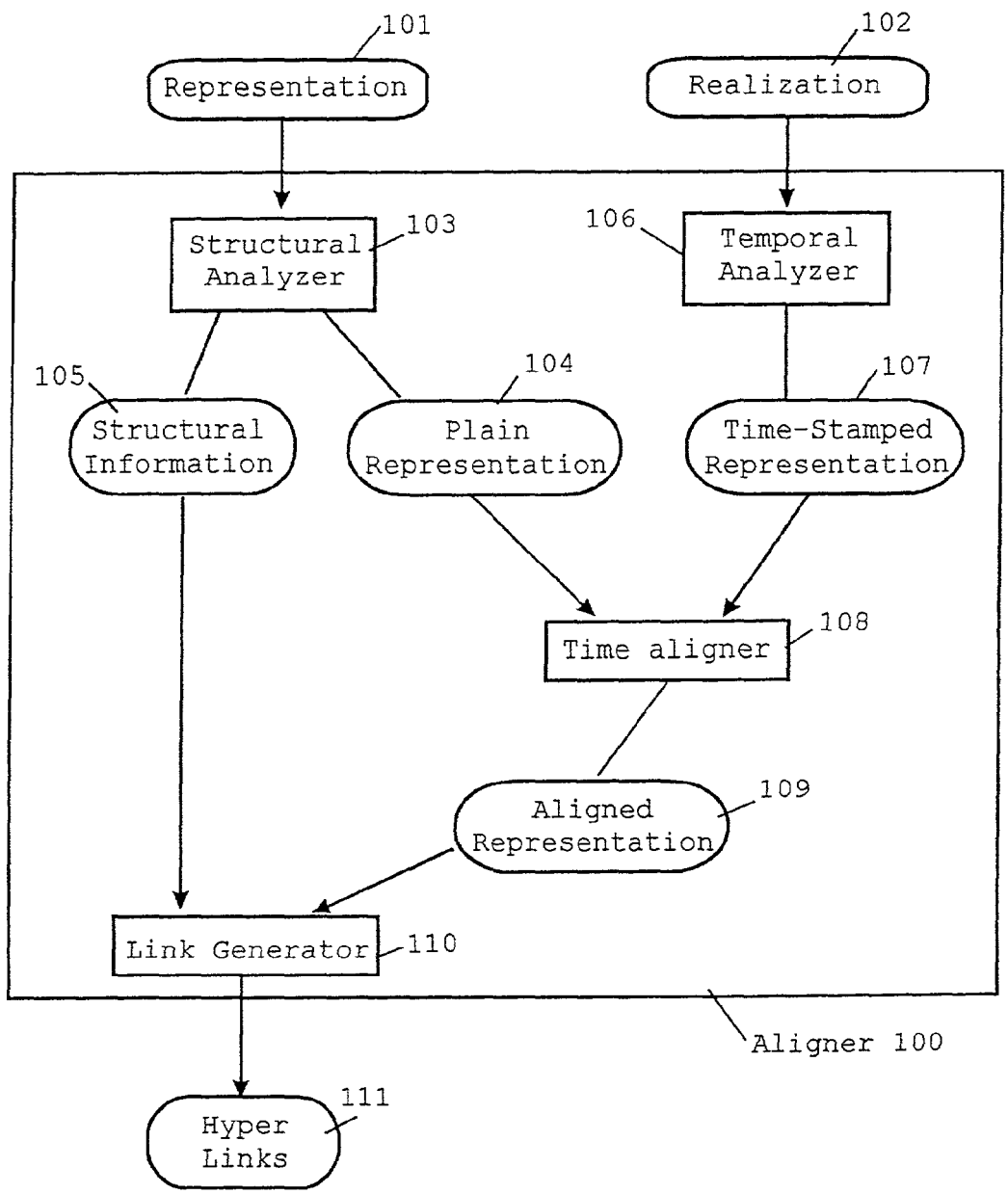
FIG. 1 is a schematic block diagram illustrating an aligner known in the prior art that can be used with the present invention.

A mechanism to generate a synchronization between a text and corresponding audio data is disclosed in U.S. patent application Ser. No. 09/447,871, which is fully incorporated herein by reference. U.S. patent application Ser. No. 09/447,871 allows for creating links (hyperlinks) between a representation, e.g. the text data, and a realization, e.g. the corresponding audio data. More specifically, U.S. patent application Ser. No. 09/447,871 provides an enhanced method and apparatus to link text and audio data. It recognizes that most acoustic multimedia data have a common property which distinguishes them from visual data. These data can be expressed in two equivalent forms: as a textual or symbolic representation, e.g. score, script or book, and as realizations, e.g. an audio stream. As used in an example of U.S. patent application Ser. No. 09/447,871, an audio stream is either an audio recording or the audio track of a video recording or similar data.

Information typically is presented as textual representation. The representation contains both the description of the content of the realization and the description of the structure of the realization. This information was used in U.S. patent application Ser. No. 09/447,871 to provide a method and apparatus for linking the representation and the realization.

Starting from a textual or symbolic representation, (e.g. a structured electronic text document) and one or multiple realizations (e.g. digital audio files like audio recording which represent the corresponding recorded spoken words) so called hyper links between the representation, (e.g. the text) and the related realization, (e.g. the audio part) are created in U.S. patent application Ser. No. 09/447,871. An embodiment in U.S. patent application Ser. No. 09/447,871 provides that the realization is structured by combining a time-stamped (or otherwise marked) version of the representation generated from the realization with structural information from the representation. Errors within the time stamped representation are eliminated by aligning the time-stamped version of the representation generated from the realization with the content of the original representation in beforehand.

The hyper links in U.S. patent application Ser. No. 09/447,871 are created by an apparatus according to one embodiment where it is stored in a hyper document. These hyper links are used for performing search operations in audio data equivalent to those which are possible in representation data. This enables an improved access to the realization (e.g. via audio databases). Furthermore it is not only possible to search for elements of the input data, (e.g. words) within the resulting hyper links or hyper document. But, it is also possible to navigate within the resulting data, (e.g. the hyper document) and define the scope of the playback. In this context the word 'navigation' means things like 'go to next paragraph', 'show complete section that includes this paragraph', etc. In an embodiment of U.S. patent application Ser. No. 09/447,871, the scope of the playback is defined by clicking a display of a sentence, a paragraph, a chapter, etc. in a hyper link document. Thereby the segments of the realization, (e.g. the audio stream) become immediately accessible. In accordance with U.S. patent application Ser. No. 09/447,871, these capabilities are not created through a manual process. All or part of this information is extracted and put together automatically.

Accordingly, the realization in accordance with an embodiment of the present invention is structured by combining a time-stamped version of the representation generated from the realization with structural information from the representation.

The aforementioned invention is based on the fact that most acoustic multimedia data have a common property which distinguishes it from visual data. The data can be expressed in two equivalent forms: as a textual or symbolic representation, e.g. score, script or book, and as realizations, e.g. an audio stream. The realization therefore can be structured by combining a time-stamped (or otherwise marked) version of the representation generated from the realization with structural information from the representation. Errors within the time stamped representation are eliminated by aligning the time-stamped version of the representation generated from the realization with the content of the original representation beforehand.

The hyper links are stored in a hyper document and are mainly used for performing search operations in audio data equivalent to those which are possible in representation data. The search operations provide for an improved access to the realization, e.g. via audio databases.

The mechanism disclosed in the previously cited U.S. patent application will now be discussed in more detail with reference to FIG. 1. The mechanism uses an aligner 100 which includes a structural analyzer 103 with input means. The structural analyzer 103 is connected via two output means to a time aligner 108 and a link generator 110. The aligner 100 further includes a temporal analyzer 106 with input means. The temporal analyzer 106 is connected via output means to the time aligner 108. The time aligner 108 having two input means for receiving data from the structural analyzer 103 as well as from the temporal analyzer 106 is connected via output means to the link generator 110. The link generator 110 having two input means for receiving data from the structural analyzer 103, as well as from the time aligner 108, has an output means for sending data.

As illustrated in FIG. 1, the structuring process starts with a representation 101 and a realization 102. Usually both the representation 101 and the realization 102 are stored in a separate file, but each of the data sets may actually be distributed among several files or be merged in one complex hyper-media file. Alternatively, both the representation 101 and the realization 102 may be fed into the system as a data stream.

Figure 2:
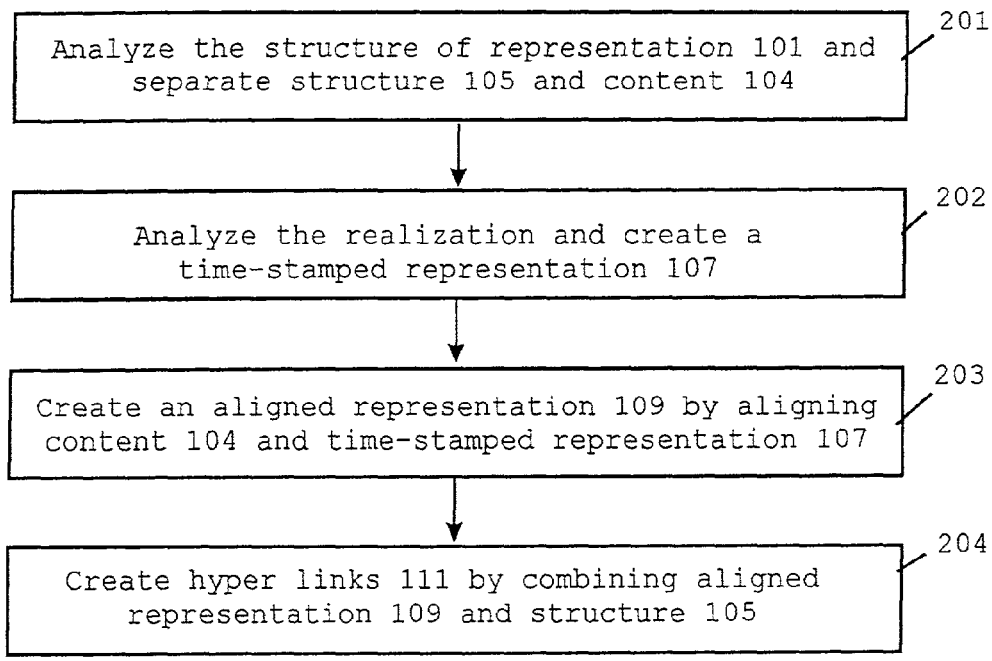
FIG. 2 is a flow chart illustrating an exemplary method for combining a representation and a realization according to the prior art.

The representation 101 is a descriptive mark-up document, e.g. the textual representation of a book, or the score of a symphony. An example of a realization 102 is an audio stream in an arbitrary format, e.g. WAVE or MPEG. An exemplary procedure for combining a representation 101 and a realization 102 of a multimedia stream is illustrated in FIG. 2. In a first processing step 201, the representation 101 is fed into the structural analyzer 103. The structural analyzer 103 analyzes the representation 101 and separates the original plain representation 104 and structural information 105. The plain representation 104 includes the plain content of the representation 101, that is the representation 101 stripped of all the mark-up.

In step 202 of FIG. 2, which may be carried out before, after, or at the same time as step 201, the realization 102, e.g. the audio stream, is fed into the temporal analyzer 106. The temporal analyzer 106 generates a time-stamped (or otherwise marked) representation 107 from the realization 102. It is advantageous to generate a time-stamped representation 107 of the complete realization 102. Some embodiments, however, create marked or time-stamped representations 107 only of parts of the realization 102.

The time-stamped representation 107 includes the transcript and time-stamps of all elementary representational units like, e.g., word or word clusters. In the above example a speech recognition engine is used as temporal analyzer 106 to generate a raw time-tagged transcript 107 of the audio file 102. Many commercially available speech recognition engines might be used, for example IBM's VIAVOICE. In addition to the recognition of words, however, the temporal/marker analyzer 106 should be able to allocate time stamps and/or marks for each word.

In FIG. 2, step 203, the plain representation 104 derived from step 201 and the time-stamped representation 107 derived from step 202 are fed to the time aligner 108. The time aligner 108 aligns the plain representation 104 and the time-stamped representation 107. Accordingly, for the aligned elements, the time locator from the time-stamped representation 107 is attached to the content elements (e.g. words) from the plain representation 104 leading to the time-stamped aligned representation 109. The time aligner 108 creates an optimal alignment of the words from the time-stamped representation 107 and the words contained in the plain representation 104. This can be done by a variety of dynamic programming techniques.

In step 204 of FIG. 2, the structural information 105 and the time-stamped aligned representation 109, e.g. in the form of data streams, are fed into a link generator 110. The link generator 110 then combines the locators of each element from the structural information 105 with a respective time locator from the time-stamped aligned representation 109, thereby creating connections, or so called time-alignment hyperlinks 111, between equivalent elements of representation 101 and realization 102. In one embodiment, these hyperlinks 111 are stored in a hyperlink document. In an alternative embodiment, these hyperlinks are transferred to a data base.

Figure 3:
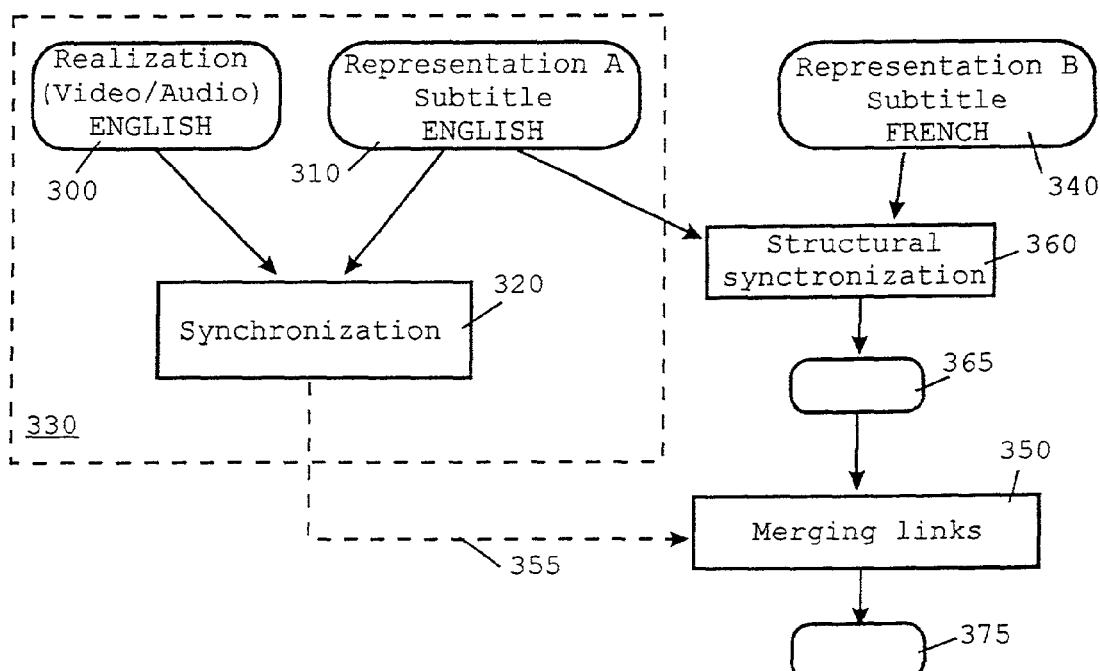
FIG. 3 is a high-level flow diagram illustrating one aspect of the present invention.

Now referring to FIG. 3, a high level overview of the method according to the present invention is illustrated by way of a high-level flow diagram. Starting with a realization 300, in the present example, a video stream including an audio track or audio substream (e.g. a common movie) in the English language, and a corresponding first representation 'A' 310 which is a plain text of the original audio substream, are synchronized 320 by the above described mechanism according to the prior art. The first representation A can already be used as a subtitle during presentation of the video/audio stream. It is further presumed that another representation B 340 for the audio substream exists which, in the present example, is a French translation of the original English audio stream or the corresponding English plain text (=representation 'A'), respectively. Synchronization 320 of the realization 300 and the first representation A 310 reveals a synchronized English version 355 of the original video/audio stream 300.

An example of such a synchronization expressed by HyTime links (ISO 10744) is shown in FIG. 22. Leaving the technicalities that are specified in the document type definition linkweb.dtd aside, the output establishes links of type primaryLink between a representation and a realization by specifying the ids of the respective linkends. The location of the linkend for the representation (in the example a text file) is identified by the id as used in the link and specified by a tree locator. The location of the linkend for the realization (in the example an audio file in WAVE format) is identified by the ID as used in the link and specified by a URL locator giving the name of the file and start and end time of the specified location.

Notably, the video/audio stream is only an exemplary embodiment. Accordingly, it also can be a pure audio stream for which translations can be provided. In order to separate the above mechanism according to the prior art from the mechanism proposed by the invention, a dotted line 330 is used.

It is now assumed that the second representation B 340, which is, for example, a plain text representing the translation of the English plain text 310 into French, also shall be synchronized with the realization 300 in order that it can be used as a further time-synchronous subtitle when presenting the video/audio stream 300.

For both the representation A 310 and the representation B 340, at first the structure is analyzed and the two revealed structures are synchronized 360 with each other in order to build structure links between equivalent structural elements of both representations A and B 310, 340. The output 365 of step 360 is illustrated in FIG. 23. The so-called structurers are modules that extract a document structure appropriate for the media type from the data. The mechanisms to extract this structural information are different for different input data such as video, audio, or text, and are not part of this invention. Based on the links in 355 and 365, the synchronization 320 also can be used to provide a time-synchronous alignment between the representation B 340 and the video/audio stream 300 by merging both one-to-one links into common one-to-many links 375 and thus by inheriting the time information from representation A onto equivalent elements of representation B. These links are illustrated in FIG. 24.

Figure 4:
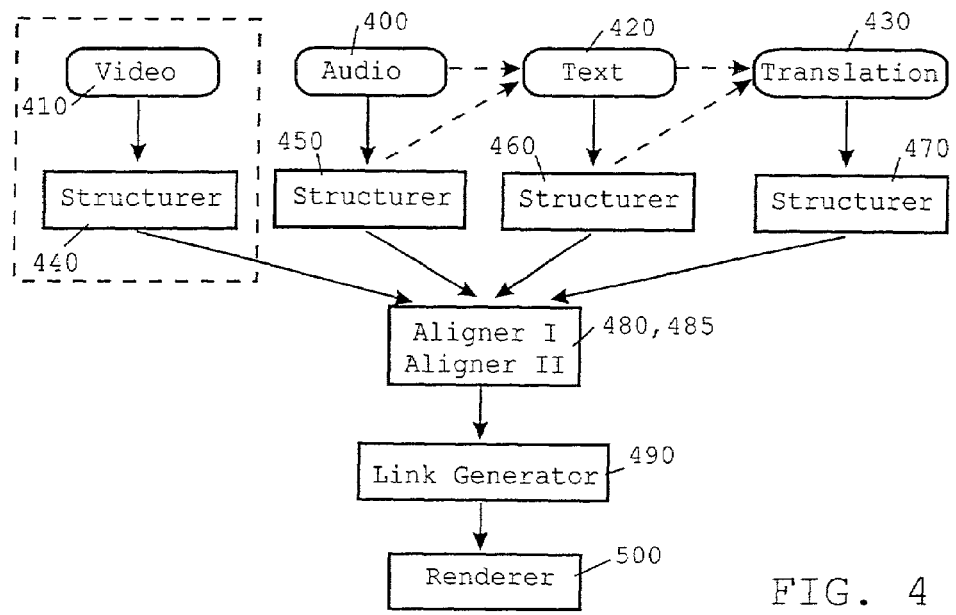
FIG. 4 is a block diagram illustrating a high-level exemplary structure for generating subtitles in accordance with the inventive arrangements disclosed herein.
Figure 5:
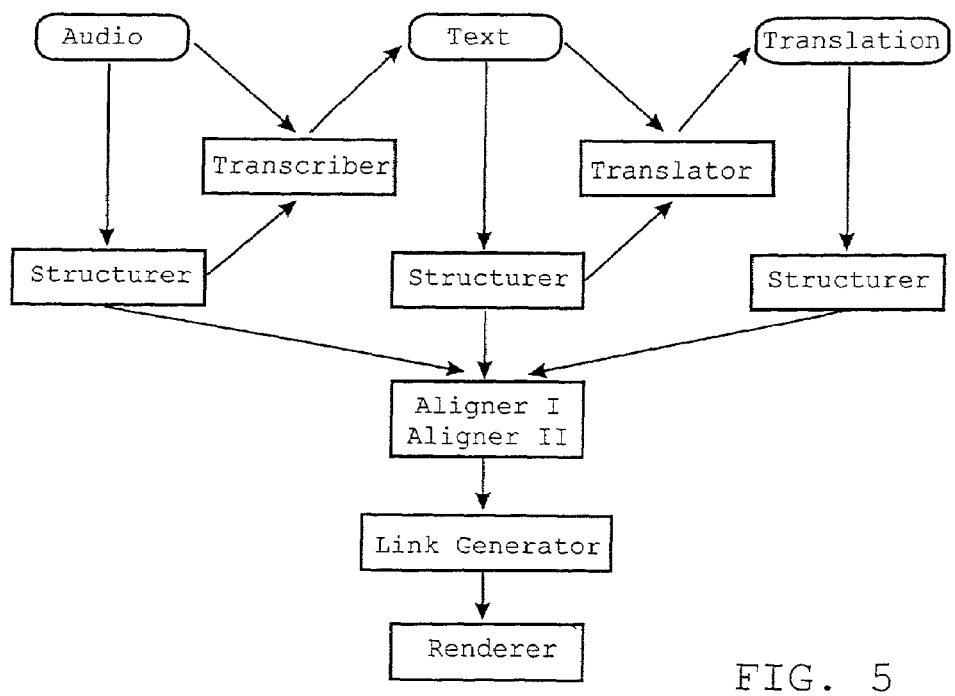
FIG. 5 is a block diagram illustrating another exemplary high-level structure for generating subtitles in accordance with the inventive arrangements disclosed herein.

FIGS. 4 and 5 depict the core system elements needed for the automatic generation of multi-lingual subtitles and their dependencies for two different embodiments. Referring to FIG. 4, as described above, the essential input data is a digital representation 400 of the audio signal associated with the material such as, for example, a recording. In cases were the material is only available in analog formats, a digital representation has to be generated by known techniques. If the material to be sub-titled is a movie, additional visual data are available.

The box "Video" 410 in the overview refers to a digital encoding of the raw video data, i.e. the visual information without the audio tracks. Similar to the case of the audio signal 400, a digital encoding of analog video information and a separation of video and audio tracks can be achieved by processing means according to the prior art. In many cases the audio-visual material is accompanied by a transcript 420 and/or a translation 430 giving one or more textual representations 420 and 430 of the spoken parts of the audio track 400. Similar to the case of the audio-visual data, it is assumed that this information is available in a digital format. Whenever only a script is available, the textual information can be digitized by state of the art OCR technologies.

The realizations 400 and 410, and the representations 420 and 430 are analyzed by means of corresponding structurers 440–470 to obtain structure information. Some structure can be inferred from most media data. For example, a video 410 is often assembled by joining sequences of uninterrupted camera output; an interview can be structured by segmenting it into the intervals corresponding to a single speaker; and the utterances of a speaker can be segmented into phrases. A set of structurers is used to extract this information. If no transcript 420, 430 is available, the structure of the audio 400 can be used to guide the automatic transcript generation by speech recognition. In a similar way the structure of the transcript 420, 430 can be used to guide the automatic translation in those cases where only one transcript 420 is available.

In the next step, two classes of aligners 480, 485 are used to synchronize both structures and data. Structure aligners 480 build a unified structure from the different input structures and a content aligner 485 synchronizes the master realization (usually the audio track) with the master representation (usually the transcript in the original language). The result of this alignment step is a web of relations between different versions of the content and different structural views of the content.

In the next step, a link generator 490 extracts a single view from this web of relationships by discarding some of the synchronization information. For instance, in the case of the alignment of a transcript with a multitude of translations, only the information needed for an individual target language is selected from the alignment. This view is used by a renderer 500 to actually drive the generation of the synchronized version by reformatting the data in a form appropriate for a sub-titling engine or a speech synthesis system.

Referring now to FIG. 5, a second embodiment is shown which describes the application of the invention in the case where only an audio recording or a video with a sound track is available. Since in this case no representational information is available, both the text spoken on the audio track, as well as the translation of the text, have to be generated automatically.

To derive the representational information, the audio track is passed through a structurer that separates the audio into sentences. Details of this procedure are referred to in European Patent Application 00116861.6 which is fully incorporated herein by reference. According to that procedure, a digitized speech signal is input to an F0 (fundamental frequency) processor that computes continuous F0 data from the speech signal. By the criterion voicing state transition (voiced/unvoiced transitions) the speech signal is pre-segmented into segments. For each segment it is evaluated whether F0 is defined or not defined (i.e. F=ON/OFF). If F0 is not defined (i.e. F0=OFF), a candidate segment boundary is assumed as described above, and starting from that boundary, prosodic features are computed. The procedural steps for the segmentation of continuous speech in accordance with an embodiment of the invention can involve inputting a digitized speech signal to an F0 processor that computes a continuous F0 data from the speech signal. Only by the criterion F0=ON/OFF, as described beforehand, the speech signal is pre-segmented into speech segments. For each segment it is evaluated whether F0 is defined or not defined. In case of a not defined F0 (i.e. F0=OFF) a candidate segment boundary is assumed as described above and, starting from that boundary, prosodic features be computed. The feature values are input into a classification tree and each candidate segment is classified thereby revealing, as a result, the existence or non-existence of a semantic or syntactic speech unit.

After initializing variables "state", "start" and "stop", for each segment (frame) it is checked whether F0 is defined (=ON) or not defined (=OFF). In case of F0=ON, it is further checked whether the variable "state" is equal zero or not. If so, it is written to the variables "state", "start" and "stop" whereby "state" is set '1', "start" is set 'stop+1' and "stop" is set to the current value of "start". Thereafter it is continued with a new segment (frame).

In case that F0 is not defined, i.e. F0=OFF, it is also checked whether variable "state" is '0'. If so, variable "stop" is set to '0' and thereafter continued with a next frame. If variable "state" is not '0', it is written to the three variables whereby variable "state" is set 1, "start" is set 'stop+1' and "stop" is set to the current value of "start".

The "Compute features" start from a candidate boundary with F0=OFF, where F0 itself is used as prosodic features and computed accordingly. In a further step, prosodic features in a time window lying before the candidate boundary are computed. Next, prosodic features are computed in a time window lying after the candidate boundary.

The feature values are input into a classification tree and each candidate segment is classified thereby revealing, as a result, the existence or non-existence of a semantic or syntactic speech unit. A binary decision or classification tree which is trained by way of analyzing sample text bodies and which comprises the same prosodic features can include the step of questioning a feature at each node starting from the root node and, depending on the obtained value, deciding on which path it is to be continued. If, for example, at one node the question f1<126? is answered with YES then it is continued on a left branch and in case of the answer NO on the right branch (not shown). Reaching one of the end nodes, a decision is made on whether a semantic boundary has been found or not. In case a boundary has been found, an underlying edit decision list (EDL) can be updated accordingly or the audio stream can be segmented at the boundaries thus revealing audio segments.

For the training of such a classification tree, a certain amount of training data in the same field as the intended application needs to be gathered beforehand. This comprises speech data and their textual representation. The latter allows for the determination of syntactic or semantic boundaries from punctuation etc. present in the text. With a system which allows for the linking of audio data with the corresponding reference text, the semantic or syntactic segment boundaries in the audio can be inferred from the corresponding boundaries in the text. Having trained the classification tree, the textual representation of audio data in the desired application is not needed. It is noted again hereby that, for the approach according to the present invention, there is no need for a speech recognizer invoked in the segmentation process.

Similar to the first embodiment, the output of this structurer is passed on to the aligner. In addition, the structure derived is used to guide a state-of-the-art speech recognition system. Current speech recognizers do not automatically transcribe the punctuation that is used to separate sentences in the transcript, but require a speaker to explicitly insert such tags. This information is taken from the audio structure and the output of the transcriber transformed from a stream of words into a sequence of sentences. This plain text is forwarded to a text structurer as described in the first embodiment, and together with text structure, fed into a state-of-the-art machine language translation system. Like in the first embodiment, the translation produced by this system is fed into a structurer and into an aligner. Further processing of the data is similar to the first embodiment.

Figure 6A:
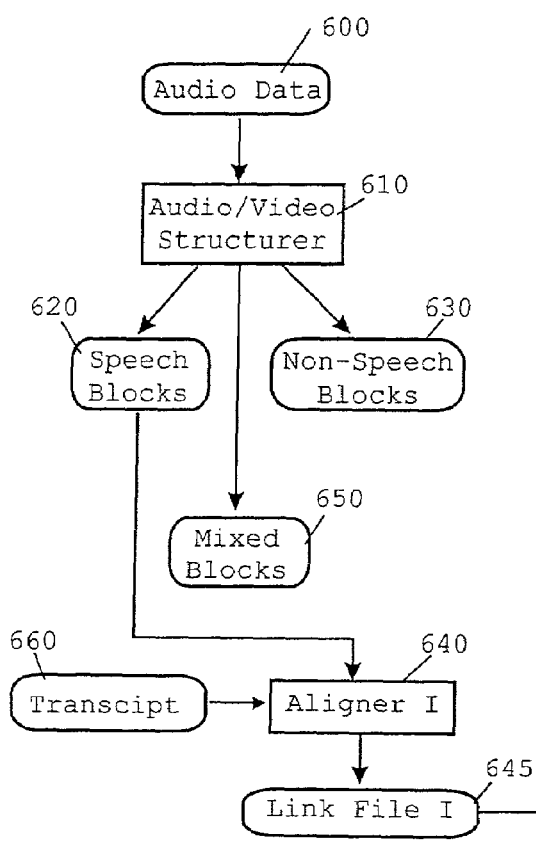
FIGS. 6a and 6b are block diagrams depicting a more detailed structure of an embodiment of the system in accordance with the inventive arrangements disclosed herein.
Figure 6B:
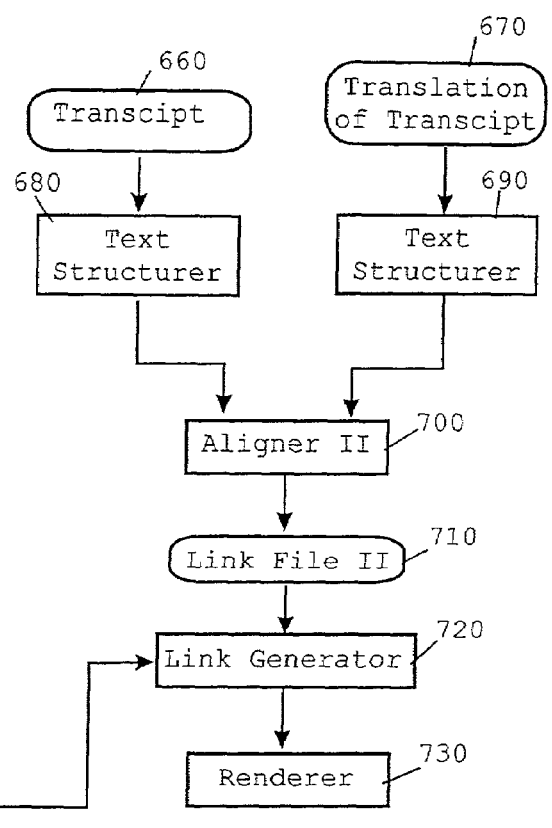
Figure 10:
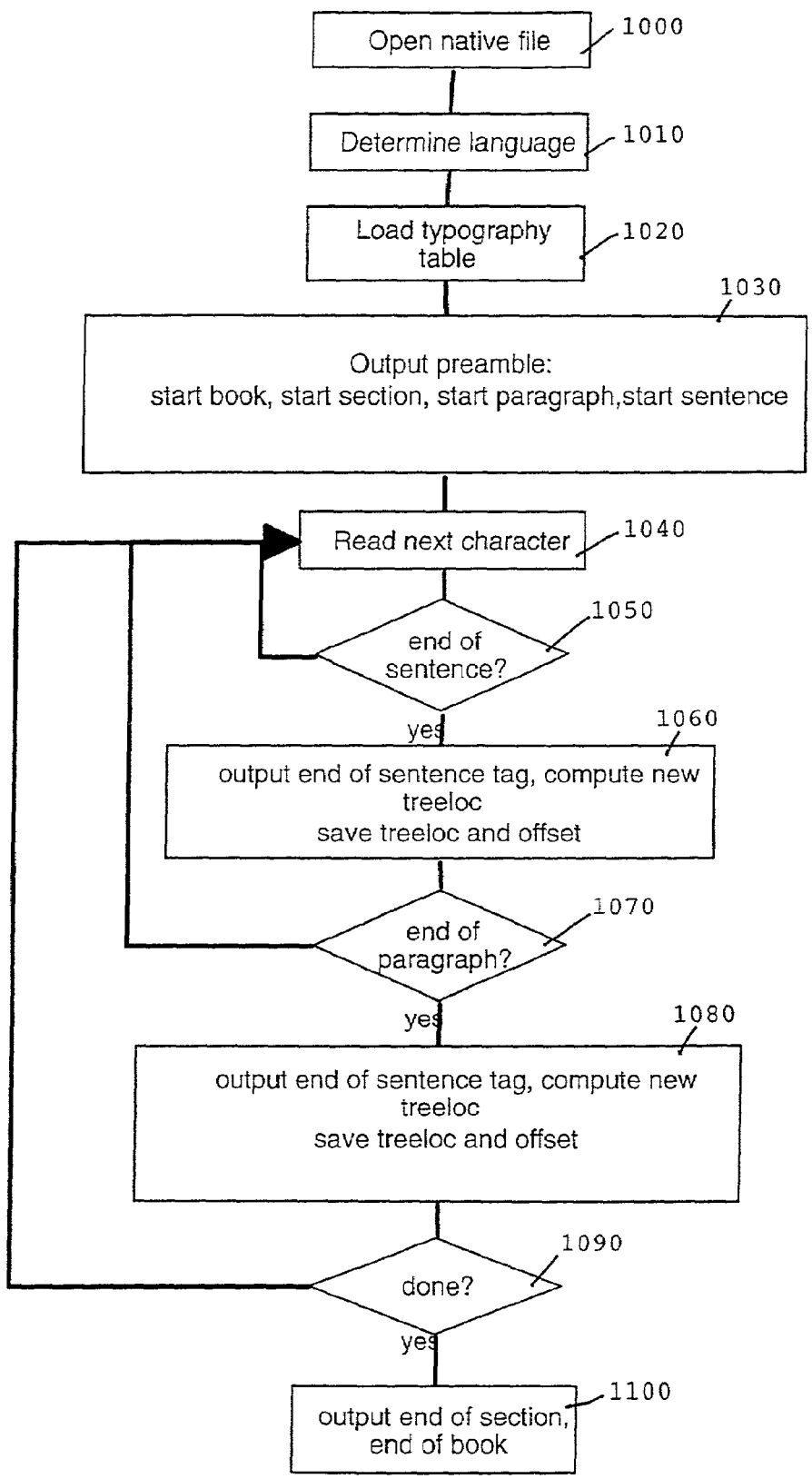
FIG. 10 is a flow diagram illustrating an exemplary method of operation for a text structurer for plain text.

The first embodiment (FIG. 4) of the system according to the invention is now described in more detail referring to the two block diagrams depicted in FIGS. 6a and 6b. Referring first to an exemplary audio structurer depicted in FIG. 6a, the audio data 600 is fed into an audio structurer 610 that separates speech 620 and non-speech segments 630 and passes the speech segments 620 on to an aligner I 640 as described above and disclosed in U.S. patent application Ser. No. 09/447,871. Note, the time-alignment process of in U.S. patent application Ser. No. 09/447,871 connects the realization domain with the representation domain and therefore allows that certain operations, which are generally difficult to perform in the realization domain, be shifted into the representation domain where the corresponding operation is relatively easy to perform. For example, in recorded speech, standard text-mining technologies can be used to locate sequences of interest. The structure information can be used to segment the audio signal in meaningful units like sentence, paragraph or chapter. Notably, only the speech segments 620 are input to the aligner I, whereas the non-speech segments 630 are not aligned since there is nothing to align. The mixed blocks 650 consisting of both speech and non-speech segments can be used on higher processing levels, e.g. generation of the tree locator 1 depicted in FIG. 10. The output of the aligner I 640 is a link file I 645 (not detailed in FIGS. 6a and b).

Now referring to FIG. 6b, the transcript 660 and translation 670 of the transcript are passed through appropriate text structurers 680, 690 which generate a document structure like that shown for the sample text "Donna Leon, Acqua alta", Macmillan (1996), depicted in FIG. 12. As described above, both structures are then processed by a structure aligner 700 (aligner II) that establishes the correspondence between equivalent structural elements and produces a link file II 710. The link file I 645 and link file II 710 are combined to a link file by a link generator 720 that is rendered by means of a renderer 730 as described above in FIG. 4.

The structuring techniques detailed in the following sections are provided by way of example to ease the understanding of the different aligners.

Structurers

Figure 7:
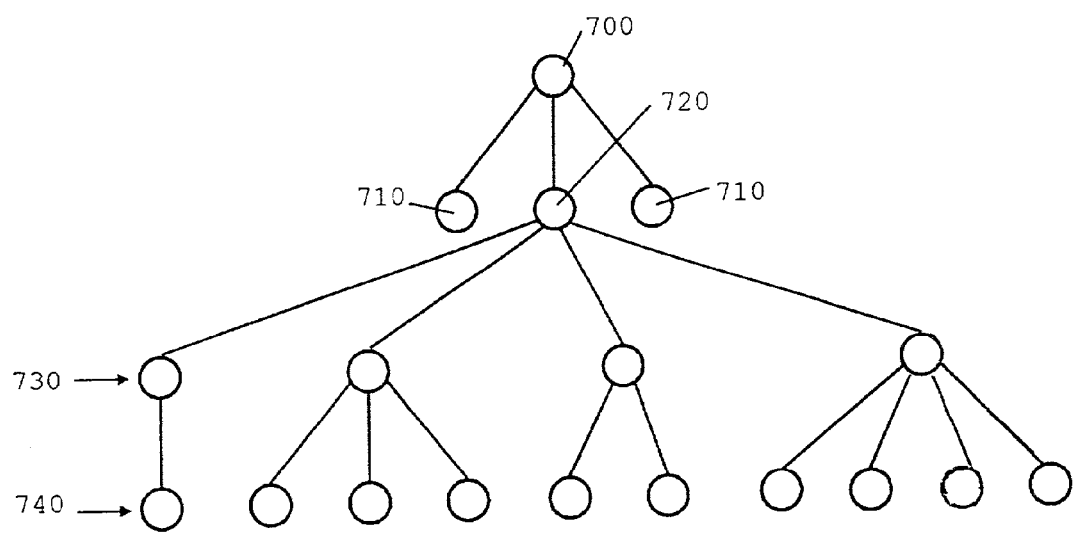
FIG. 7 illustrates a document structure for audio as generated by performing speech/non-speech segmentation, speaker segmentation, and phrase segmentation.

1. Audio Structurer. An audio structure suitable for the automatic generation of sub-titles derives a structure from the audio stream that segments the continuous audio stream containing speech into phrases and a super-structure as illustrated in FIG. 7. The root node 700 of the tree corresponds to the complete audio stream. The children of the root node represent continuous segments of speech (710) and non-speech (720) audio. Each segment containing recorded speech is segmented into continuous intervals containing the utterances of an individual speaker (730, layer 3). The utterances of an individual speaker are segmented into phrases (roughly corresponding to sentences in written language) which are the leaf nodes 740 of the audio structure tree. State of the art techniques are available for the automatic segmentation of speech/non-speech parts and for the generation of segments corresponding to individual speakers (see for instance Lynn Wilcox, Francine Chen, Don Kimber, Vijay Balasubramanian, *Segmentation of Speech Using Speaker Identification*, Proc. ICASSP '94, Adelaide, Australia, 161–4 (1994) ("Wilcox"); Claude Montacié, Marie-José Caraty, *A Silence/Noise/Music/Speech Splitting Algorithm*, Proc. (ICSLP '98) ("Montacie"). More specifically, as discussed in Wilcox, segmentation of conversational speech based on speaker identity can be performed using Viterbi decoding on a hidden Markov model network consisting of interconnected speaker sub-networks. Speaker sub-networks are initialized using Baum-Welch training on data labeled by speaker, and are iteratively retrained based on the previous segmentation. If data labeled by speaker is not available, agglomerative clustering is used to approximately segment the conversational speech according to speaker prior to Baum-Welch training. The distance measure for the clustering is a likelihood ratio in which speakers are modeled by Gaussian distributions. The distance between merged segments is recomputed at each state of the clustering, and a duration model is used to bias the likelihood ratio. Segmentation accuracy using agglomerative clustering initialization matches accuracy using initialization with speaker labeled data. Montacié discusses techniques to warp audio data of a video clip movie on its movie script. In order to improve this script warping, a new algorithm splits audio data into silence, noise, music and speech segments without a training step. This segment splitting uses multiple techniques such as voice/unvoiced segmentation, pitch detection, pitch tracking, speaker and speech recognition techniques.

Figures 8, 9:
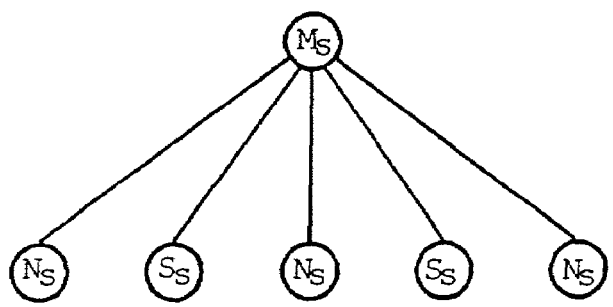
FIG. 8 illustrates a typical output of an audio structurer configured to detect speech/non-speech transitions, speaker changes, and phrases.
FIG. 9 illustrates an exemplary document structure for audio as determined by the audio structurer of the first embodiment where Nodes are labeled by segment type.

The output from the audio structurer is either stored or forwarded to aligners as a sequence of tree locators, as illustrated by the exemplary output depicted in FIG. 8. Further details are described in the description of the preferred embodiments to follow.

2. Text Structurer. The detail of structural information that can be extracted from a text depends on the markup convention used to write the text. For example, a text may either be a plain text containing no more markup information than required by the orthographic rules of a language, a structured plain text that uses certain conventions to mark the structure of the text document, or a text encoded in a formal markup language such as HTML, XML, or LATEX.

Plain text can be segmented by exploiting the typographic conventions of a language's writing system. Most languages use special typographic signs to mark sentence boundaries or flag direct speech. During the past decades, such conventions have been used even in writing systems that traditionally did not rely on such markup like, for example Chinese or classical Latin. A structurer exploiting only such features is specific for the language of the text and exploits a fixed set of rules.

Structured plain text uses an additional set of conventions that vary between different text sources and corpora to denote the super-structure (i.e. paragraphs and chapters) of the text. Example of such documents are the texts of the Gutenberg etext collection where an empty line is used to mark paragraph boundaries or documents conforming to the structuring requirements (see for instance DIN 1421) where a decimal scheme of tags is used to label titles according to the structural position of corresponding paragraphs. Structurers exploiting structured plain text depend on the structuring conventions applied and have to be written or adapted for each text corpus.

Accordingly, texts tagged using a standardized markup language can be viewed as instantiations of a document type either specified explicitly, for example with document type definitions (DTDs) used by markup languages derived from SGML, or implicitly (i.e. with the style sheets or templates used by LATEX respectively WORD). For such documents, a document object model is derived from the formal definition of the document structure in, e.g. the DTD, and segments of the document are linked with a tree representing the document structure. Structurers for markup texts depend on the markup language used, but are otherwise generic.

For all three text types, the output of the text structurer is a sequence of tree locators that are stored or forwarded to the Aligners. Only the depth of the tree is different for the three text classes. Usually it is flat for plain texts and more elaborate and multi-layered for texts tagged with a markup language.

Aligners

In addition, aligner modules are used to synchronize the different structures determined by the structurers with each other and with the realization of the audio-visual stream. Both structure—structure aligners and structure-content aligners compute the optimal match between their input data (usually by applying a dynamic programming algorithm) and produce as an output a sequence of links between the input data in the form of independent hyperlinks. There are various notations to express independent hyperlinks. The notational convention used here is the one of HyTime ilinks (see e.g. LIT ISO 10744).

A link generator assembles the dyadic hyperlinks generated by the aligners into a web of multi-ended links. The output of the link generator is a sequence of one-to-many links that connect all equivalent elements in the different realizations and representations. There are various notations to express independent hyperlinks. For example, the notational convention used here is the one of HyTime ilinks (LIT ISO 10744).

Thereupon, the link-web collected by the link generator contains all the relationships between the different realizations and representations of a media stream. In most cases, an application is not interested in all the data, but only in a specific view of these relationships. A typical example for such a view is the link between the audiovisual data and the translation of the original dialogue in one target language. For that purpose, renderers are used. Accordingly, in a first processing step, the renderer selects this view from the link-web by selecting only those link-ends from the one-to-many links that refer to the targets that are to be used by the application. In a second processing step, the selected view is rendered, i.e. transcoded into the format needed to make the selected link-ends visible or audible. In the simplest case, rendering only reformats the links and the referred link-ends into a format conforming to a presentation language like, for example, SMIL. In more complex cases, the renderer feeds subtitling hardware with the information needed to produce the overlayed subtitles for the video or a text-to-speech system to produce an audible synchronization.

A preferred embodiment of the invention for the automatic generation of sub-titles will be described herein in more detail, i.e. a system where a transcript and a translation are available. Referring back to the first embodiment depicted in FIG. 4, the audio data is fed into a structurer that uses state of the art techniques to segment the audio stream into speech and non-speech blocks (see for instance Lynn Wilcox, Francine Chen, Don Kimber, Vijay Balasubramanian, *Segmentation of Speech Using Speaker Identification*, Proc. ICASSP '94, Adelaide, Australia, 161–4 (1994); and Claude Montacié, Marie-José Caraty, *A Silence/Noise/Music/Speech Splitting Algorithm*, Proc. ICSLP '98). As discussed in Wilcox, the ability to segment conversational speech based on change in speaker is useful in audio indexing applications. Speaker change markers in the audio stream allow random access to otherwise sequential data. For example, speaker change markers provide the capability to skip to the next speaker when reviewing audio data, or to playback only those portion s of the audio corresponding to a particular speaker. Identification of pauses, or silence intervals, in conversational speech is also important in audio indexing. The basic framework for segmentation is a hidden Markov model (HMM) network consisting of a sub-network for each speaker and interconnections between speaker sub-networks. Speech is represented as a sequence of cepstral vectors. Speaker segmentation is performed using a Viterbi decoder, and noting those times when the optimal state sequence changes between speaker sub-networks. A similar decoder has been used with a single state sub-networks. The speaker sub-networks used in Wilcox are multi-state HMMs with Gaussian output distributions. Similar non-phonetic and phonetic models have been applied to speaker identification, but segmentation was not considered. Since pauses in conversational speech are not well modeled with these speaker sub-networks, silence states with tied output distributions are added to each speaker sub-network.

In cases where the speakers are know a priori, and where it is possible to obtain sample data from their speech, the speaker sub-networks can be initialized using the standard Baum-Welch training algorithm. Segmentation accuracy is improved by iteratively performing Viterbi decoding on the speaker models to compute a segmentation and then re-training the models based on the computed segmentation. When the speakers are not known a priori, or when no training data fro the speakers is available, this iterative retraining technique is still applicable. However, initial estimates of the speaker sub-networks are required.

The document structure derived by this structurer is shown in FIG. 9. Such a document structure is typical for most audio books that combine segments of music with narration: the document starts with a short piece of music as introduction, the individual chapters are separated by short musical interludes, and after the last narrative segment, a final piece of music is used as a trailer. In the tree diagram representing the structure of the audio, the node in layer one represents the complete audio data. Each node in layer two represents a homogeneous segment of either speech or non-speech data. The nodes in layer one are ordered from left to right according to increasing time. All nodes carry as attributes a label for the type of segment (M: mixed, N: non-speech, S:speech) and a reference to the boundaries of the segment in appropriate units like time-offset or byte-offset into the audio data. Various methods exist to encode such an audio structure tree and communicate it to the aligner. One method is shown in FIG. 8. The first column of the table contains the tree locator to uniquely identify the node. The second column contains a label for the segment type. Columns three and four are used to store start and stop time of the segment.

Both the transcript and the translation thereof are processed by a text structure analyzer, the output of which is a stream of tree locators expressing the structure of the text and a text decorated with markup. The processing steps for plain text like the one shown in FIG. 12 are illustrated by way of the flowchart depicted in FIG. 10. The file or stream containing the text is opened 1000, and in a first step, the language of the text is determined 1010. This can be done either interactively by an operator or by automatic methods as described in Y. K. Muthusamy, E. Barnard and R. A. Cole, *Automatic Language Identification: A Review/Tutorial*, IEEE Signal Processing Magazine (October 1994) ("Muthusamy"), or I. D. Melamed, *A Geometric Approach to Mapping Bitext Correspondence*, Proceedings EMNLP '96, Philadelphia (1996). As described in Muthusamy, automatic language identification (language ID for short) is the problem of identifying the language being spoken from a sample of speech by an unknown speaker. As with speech recognition, humans are the most accurate language identification systems in the world today. Within seconds of hearing speech, people are able to determine whether it is a language they know. If it is a language with which they are not familiar, they often can make subjective judgments as to its similarity to a language they know, e.g., "sounds like German."

Languages have characteristic sound patterns; they are described subjectively as singsong, rhythmic, guttural, nasal, and so on. Language differ in the inventory of phonological units (speech sound categories) used to produce words, the frequency of occurrence of these units, and the order in which they occur in words. The presence of individual sounds, such as the "clicks" found in some sub-Saharan African languages, or the velar fricatives found in Arabic, are readily apparent to speakers of languages that do not contain these phonemes. Less obvious acoustic patterns are also observed. Mandarin Chinese has a higher frequency of occurrence of nasals than English. Hawaiian is known for its very limited consonant inventory. Prosodic patterns also differ significantly among languages. For example, it has been shown that fundamental frequency ($F_0$) patterns of continuous speech display different characteristics in Mandarin Chinese (a tone language) and American English (a stress language). The key to solving the problem of automatic language identification then, is the detection and exploitation of such differences among languages. Of course, if a system could "understand" each language, it would also be identifying the correct one in the process. However, speech recognition or understanding in multiple languages is still very much an unsolved problem.

Then the language-specific table of tags to encode the sentence structure of the text and the corpus-specific table of tags for paragraph structure are loaded 1020. In the example texts shown in FIG. 12, both languages use the same end-of-sentence tag, a full-stop, but different tags to mark direct speech (double quotes in German versus single quotes in English). In both texts, an empty line is used to mark paragraph boundaries. As a first processing step, the parser initiates the processing and stores or forwards start tags for all structural elements used. Until the complete text file or text stream is processed, the parser tests 1040 each character to determine whether it is an end-of-sentence marker, and then whether it is an end-of-paragraph marker 1050. Whenever an end-of-sentence character is found, an end-of-sentence tag is added to the text, a new tree-locator is computed, and a tree-locator and offset are either stored or forwarded to the aligner 1060. Whenever an end-of-paragraph character is found 1070, an end-of-paragraph tag is added to the text, a new tree-locator computed, and a tree-locator and offset are either stored or forwarded to the aligner 1080. After the complete text is processed 1090, closing tags for all open tags are written to the text 1100.

Figures 14, 16:
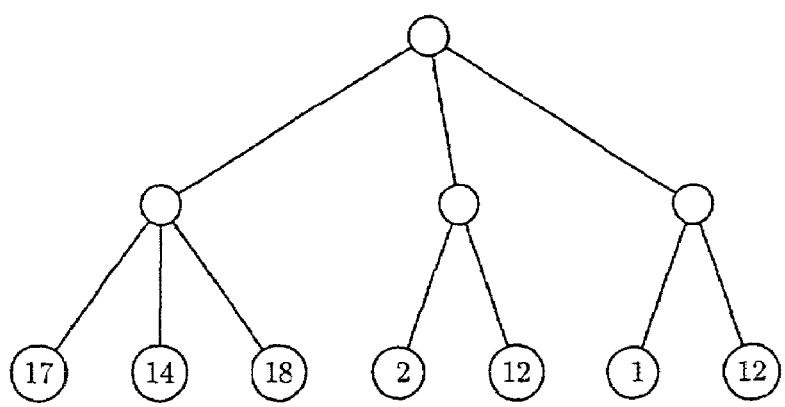
FIG. 14 is an exemplary mapping table between a Tree Locator and Tree Locator ID.
FIG. 16 is a schematic diagram illustrating an exemplary document structure of the text sample of FIG. 12 as determined by the text structurer of the first embodiment of the invention where sentence nodes are labeled by the number of dependent word nodes.

The resulting structured text is shown in FIG. 13. The document structure of the example text depicted in FIG. 12 is shown in FIG. 16 where, instead of word nodes, the number of word children is shown in the sentence nodes. For a text structured in a mark-up language, additional superstructure grouping of the sentences into paragraphs, chapters, and the like is extracted from the mark-up with methods as described in previously cited U.S. patent application Ser. No. 09/447,871. Various methods exist to encode such a text structure tree and to relate it to the text. The one used in the first embodiment is similar to the encoding described in the previously cited U.S. patent application Ser. No. 09/447,871 using mapping tables between tree-locators and node-names (FIG. 14), and mapping tables between tree locators and the text (FIG. 15). Audio, audio structure, text structures, and texts are passed into the aligner and processed by two alignment modules.

The speech segments of the audio, as identified by the audio structure shown in FIG. 9, are aligned with the transcript of the original language using the methods described in the above cited U.S. patent application Ser. No. 09/447,871. The second alignment module aligns the structure of the original text and the translation, and produces a link file that links corresponding nodes in both structures as shown in FIG. 18. As can be seen from the example text, translations usually preserve the structure of the original text, even in cases where they are slightly uncomplete. The phrase "pronouncing her last name in the Italian fashion" is missing from the German version of the text, but the structure of both examples is identical. Therefore the alignment of the document structure implies in most cases an alignment of text and translation. Of course, structural equivalence cannot guarantee perfect alignment. Cases where, for example, one sentence is split into two sentences in the translation and two other sentences are merged will not align correctly based on structural information only. In cases where such transformations between text and translation are likely (i.e. the case of German translated into English), or in cases where the structure aligner produces too many mismatches, the structure based text alignment module can be amended by a bitext aligner.

Figure 19:
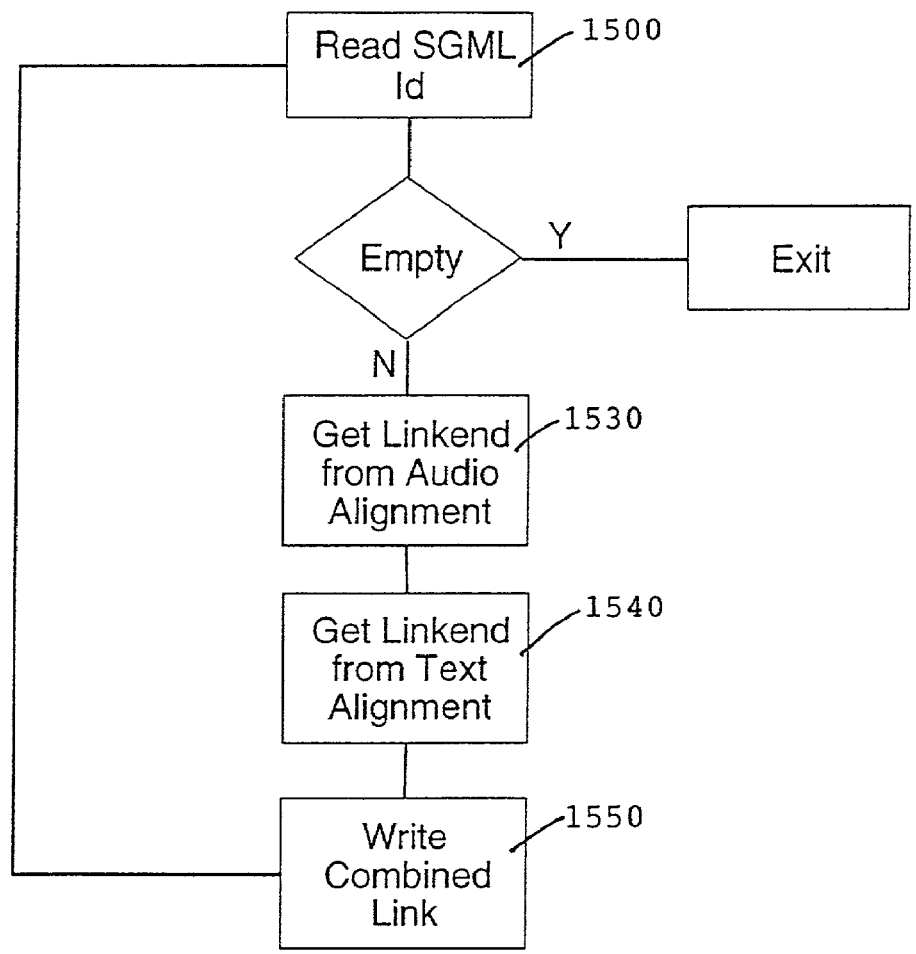
FIG. 19 is a flow diagram illustrating an exemplary method of operation for a link generator in accordance with the inventive arrangements disclosed herein.

The structure aligner is illustrated by way of a flow chart shown in FIG. 11. The document structures for both the original text and the translation are fed 1200 into module 1210 which computes the maximum agreement sub-tree (MAST), i.e. an optimal alignment of both tree structures. This is done by known techniques, i.e. the algorithms described in Martin Farach/Mikkel Thorup, *Sparse Dynamic Programming of Evolutionary-Tree Comparison*, SIAM J. Comput, 26, 210–30 (1997) ("Farach"), or the algorithms as described in the literature cited therein. Farach describes the MAST problem as follows: Given a set $A_i$ and two rooted trees $T_0$ and $T_1$ leaf-labeled by the elements of $A_i$, find a maximum-cardinality subset B of A such that the topological restrictions $T_0$ and $T_1$ to B are isomorphic. Farach shows that this problem reduces to unary weighted bipartite matching (UWBM) with an additive overhead. Farach also shows that UWBM reduces linearly to MAST. Thus his algorithm is optimal unless UWBM can be solved in near linear time. The overall running time of his algorithm improves on the previous best algorithm. If the document structure of the translation is equal 1220 with the document structure of the text, i.e. if all nodes of the translation tree align with the corresponding nodes of the text tree, the links between both document structures are stored or forwarded 1230 to the link generator (see also FIG. 19). If both document structures are not equal 1220, further processing depends on the percentage of unaligned tree nodes. If the percentage of unaligned nodes is below a user-selectable threshold 1240, and the system is not in interactive mode 1250, the links between both document structures are stored or forwarded 1260 to the aligner, for example leaving some elements of the document structure unaligned. There will be elements in the text or the translation that do not have counterparts in the other document. If the system is in interactive mode, the unaligned structure element and the text instantiating them is displayed 1270 in a GUI together with the preceding and succeeding structure elements and corresponding texts. This allows an operator to manually correct the alignment. The corrected alignment is stored or forwarded 1280 to the link generator. If the percentage of unaligned nodes in the document structure is above the user-selected threshold, the markup text and the markup translation are aligned 1290 using state-of-the-art techniques like the one described in I. D. Melamed, *A Geometric Approach to Mapping Bitext Correspondence*, Proc. of the First Conference on Empirical Methods in Natural Language Processing, Philadelphia (1996) ("Melamed"), or M. Simard/P. Plamondon, *Bilingual sentence alignment*, Proc. of the Second Conference of the Association for Machine Translation in the Americas, Montreal (1996). Melamed, in particular, discusses an algorithm he calls Geometric Sentence Alignment. Melamed generally states that the first step in most corpus-based multilingual Natural Language Processing work is to construct a detailed map of the correspondence between a text and its translation. Several automatic methods for this task have been proposed in recent years. Yet even the best of these methods can err by several typeset pages. The Smooth Injective Map Recognizer (SIMR) is a new bitext mapping algorithm. SIMR's errors are smaller than those of the previous front-runner by more than a factor of 4. Its robustness has enabled new commercial-quality applications. The greedy nature of the algorithm makes it independent of memory resources. Unlike other bitext mapping algorithms, SIMR allows crossing correspondences to account for word order differences. Its output can be converted quickly and easily into a sentence alignment. SIMR's output has been used to align over 200 megabytes of the Canadian Hansards for publication by the Linguistic Data Consortium. Again, the links between both document structures resulting 1300 from the bitext alignment are stored or forwarded 1310 to the link generator.

As can be seen in FIG. 20, the link information from both alignment modules is combined into one web of one to many links by the link generator. As shown in the flow diagram depicted in FIG. 19, the link generator collects for markup language ID 1500 in the text document structure (FIG. 14) all the links 1530, 1540 that reference this node and write 1550 the link-web that is stored or forwarded to the renderer.

Figure 21:
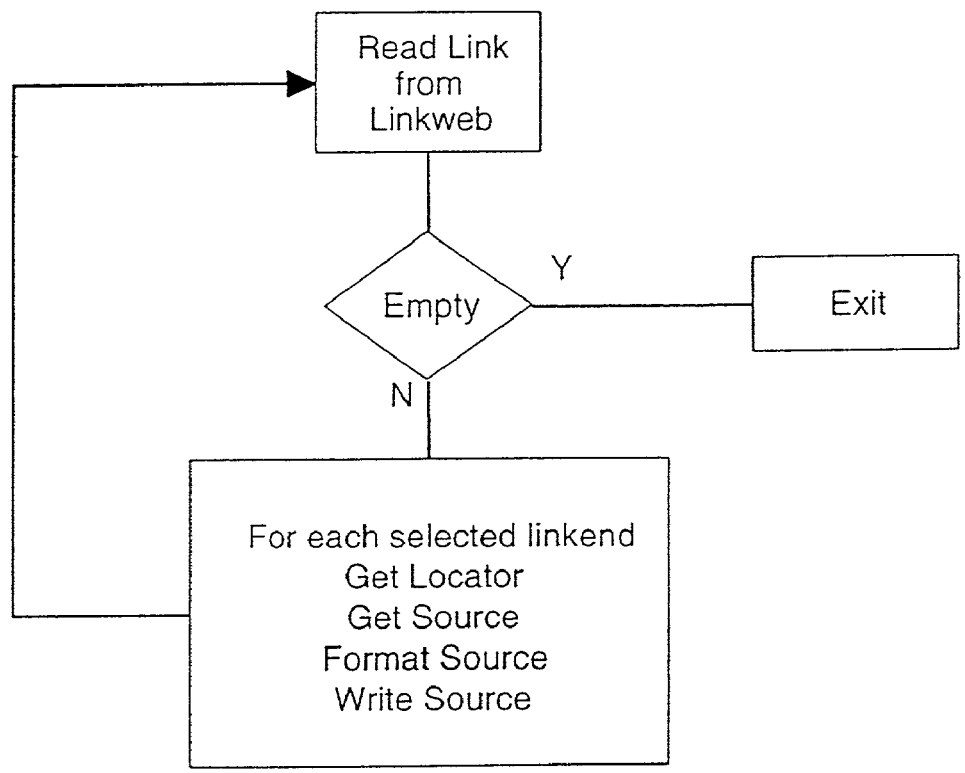
FIG. 21 is a flow diagram depicting an exemplary algorithm performed by a renderer for generating a view from a link-web.

The last two processing steps are performed by the renderer. In a generic step, the renderer generates a view from the link-web by selecting the active link-ends from the link-web, e.g. the language selected and the audiovisual data, and follows the links to their targets, as can bee seen in FIG. 21. In a second step, this information is either formatted according to the grammar of the presentation language or synthesized to become visible or audible.

What is claimed is:

1. A computer-based method of synchronizing a realization of a media stream having at least one version of content and having a first representation synchronized with said realization, and at least one second representation, said method comprising:

determining structure information for said first representation and said at least one second representation;

determining structure association information between said first representation and said at least one second representation, wherein said structure association information includes semantic structure association information;

synchronizing said at least one second representation with said first synchronized representation and said realization using said semantic structure association information; and aligning said at least one version of content with said first representation to produce a web of relations between a structural view of said at least one version of content and said first representation.

2. The method according to claim 1, said step of determining structure information further comprising:

analyzing said structure information of said first and said at least one second representation, and providing a stream of tree locators.

3. The method according to claim 2, further comprising:

aligning said determined structure information of said first representation and said at least one second representation using said semantic structure association information in a form lacking temporal information.

4. The method according to claim 3, further comprising:

aligning an audio stream specified by said media stream with an audio structure corresponding to said audio stream.

5. The method according to claim 3, further comprising:

aligning a text stream specified by said media stream with a text structure corresponding to said text stream.

6. The method according to claim 1, wherein the step of synchronizing said at least one second representation and said realization is done using only said semantic structure association information.

7. A system for synchronizing a realization of a media stream having at least one version of content and having a first representation synchronized with said realization, and at least one second representation, said system comprising:

a first structurer configured to determine structure information for said first representation;

at least a second structurer configured to determine structure information for said at least one second representation; and a first aligner configured to align said structure information for said first representation and said at least one second representation;

wherein said first aligner aligns in part at least a semantic structure association information lacking temporal data forming a portion of said structure information for said first representation and said at least one second representation and produces a web of relations between a structural view of said at least one version of content and said first representation.

8. The system according to claim 7, further comprising:

at least one renderer configured to render said at least one second representation, after being synchronized, in a form suitable for displaying as an overlayed subtitle.

9. The system according to claim 8, wherein said realization specifies a media stream, said system further comprising:

a tree aligner configured to determine a tree structure for said media stream.

10. The system according to claim 9, further comprising: means for detecting speech and non-speech boundaries.

11. The system according to claim 9, further comprising: means for detecting transitions and speaker changes.

12. A machine-readable storage, having stored thereon a computer program having a plurality of code sections executable by a machine for causing the machine to perform the steps of:

determining structure information for a first representation being synchronized to a corresponding media stream and at least one second representation;

determining structure association information between said first representation and said at least one second representation, wherein said structure association information includes semantic structure association information lacking temporal information;

synchronizing said at least one second representation with said first synchronized representation and said realization using said semantic structure association information and;

aligning said determined structure information of said first representation and said at least one second representation to produce a web of relations between a structural view of at least one version of content of a realization and said first representation.

13. The machine-readable storage according to claim 12, said step of determining structure information further comprising:

analyzing said structure information of said first and said at least one second representation, and providing a stream of tree locators.

14. The machine-readable storage according to claim 12, further comprising:

aligning an audio stream specified by said media stream with an audio structure corresponding to said audio stream.

15. The machine readable storage according to claim 12, further comprising:

aligning a text stream specified by said media stream with a text structure corresponding to said text stream.

16. The machine-readable storage according to claim 12, said step of synchronizing said at least one second representation and said realization is done using only said semantic structure association information.

* * * * *